United States Patent
Dragomir et al.

(10) Patent No.: US 9,554,240 B2
(45) Date of Patent: Jan. 24, 2017

(54) MULTIPLE CONNECTION MANAGEMENT FOR BLUETOOTH LOW ENERGY DEVICES

(71) Applicant: Freescale Semiconductor, Inc., Austin, TX (US)

(72) Inventors: Ioan-Virgil Dragomir, Bucharest (RO); Georgel Bogdan Alexandru, Corabia (RO); Alexandru Balmus, Piatra Neamt (RO)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 14/728,368

(22) Filed: Jun. 2, 2015

(65) Prior Publication Data
US 2016/0295352 A1    Oct. 6, 2016

(30) Foreign Application Priority Data
Mar. 30, 2015    (RO) ............................... A201500231

(51) Int. Cl.
*H04B 7/00*    (2006.01)
*H04W 4/00*    (2009.01)
(Continued)

(52) U.S. Cl.
CPC ............. *H04W 4/008* (2013.01); *H04W 12/00* (2013.01); *H04W 12/04* (2013.01);
(Continued)

(58) Field of Classification Search
CPC .... H04W 4/008; H04W 12/04; H04W 76/025; H04W 88/02
(Continued)

(56) References Cited

U.S. PATENT DOCUMENTS 6,760,580 B2 *  7/2004  Robinson ................ H04L 51/04
                                              455/412.2
8,880,028 B2 * 11/2014  Han .................... H04M 1/7253
                                              235/492
(Continued)

FOREIGN PATENT DOCUMENTS

WO    WO2014/088230    6/2014

OTHER PUBLICATIONS

Texas Instruments, "Bluetopia for RF3 Integration", Application Report, 7 pgs. (Dec. 2003).
(Continued)

*Primary Examiner* — April G Gonzales

(57) ABSTRACT

Methods and systems are disclosed for multiple connection management for Bluetooth (BT) devices, and more particularly for BT Low Energy (BLE) devices, to multiple different bonded BT peer devices. A BT device database within a non-volatile memory (NVM) stores identification and persistent information for each bonded BT peer device. At power-on reset (PoR), only device identification information (DII) data, such as an address (ADDR) and an IRK (identity resolving key), for each bonded BT peer device is copied from the NVM to a volatile memory that is used for run-time operation. When a bonded BT peer device forms an active connection, it is identified using the DII data, and its persistent data is copied from NVM to volatile memory as run-time data. The BT device then communicates with the actively connected BT peer device at least in part using the run-time data for the actively connected BT peer device.

20 Claims, 5 Drawing Sheets

(51) Int. Cl.
*H04W 12/00* (2009.01)
*H04W 12/04* (2009.01)
*H04W 76/02* (2009.01)
*H04W 8/00* (2009.01)
*H04W 84/18* (2009.01)
*H04W 88/02* (2009.01)

(52) U.S. Cl.
CPC .......... *H04W 76/025* (2013.01); *H04W 8/005* (2013.01); *H04W 84/18* (2013.01); *H04W 88/02* (2013.01)

(58) Field of Classification Search
USPC ....................................................... 455/41.2
See application file for complete search history.

(56) References Cited

U.S. PATENT DOCUMENTS

| | | | | |
|---|---|---|---|---|
| 2003/0229900 | A1* | 12/2003 | Reisman | G06F 17/30873 725/87 |
| 2004/0109441 | A1 | 6/2004 | Hur et al. | |
| 2004/0141594 | A1* | 7/2004 | Brunson | H04L 12/58 379/88.12 |
| 2005/0114493 | A1* | 5/2005 | Mandato | H04L 67/327 709/223 |
| 2005/0277406 | A1* | 12/2005 | Diroo | H04M 3/42042 455/412.2 |
| 2006/0007899 | A1* | 1/2006 | White | H04M 3/42042 370/338 |
| 2009/0174525 | A1 | 7/2009 | Yamauchi | |
| 2013/0259230 | A1* | 10/2013 | Polo | H04L 63/0272 380/270 |
| 2014/0094123 | A1* | 4/2014 | Polo | H04W 52/0216 455/41.2 |
| 2014/0105396 | A1* | 4/2014 | Engelien-Lopes | H04W 12/04 380/270 |
| 2014/0274033 | A1* | 9/2014 | Smart | H04W 4/008 455/426.1 |
| 2014/0302783 | A1* | 10/2014 | Aiuto | H04W 52/16 455/41.2 |
| 2015/0230167 | A1* | 8/2015 | Choi | H04W 48/20 455/411 |

OTHER PUBLICATIONS

MindTree, "MindTree's Bluetooth Product Line Overview", 4 pgs (Feb. 2015).
Broadcom, "Broadcom Announces Automotive Bluetooth Software Stack for Seamless In-Car Android Connectivity", 2 pgs. (Dec. 2013).
Alpwise, "Bluetooth Low Energy Protocol Stack SDK", 2 pgs. (Feb. 2015).
Bluetooth, "Bluetooth Core Specification 4.2 Frequently Asked Questions", 5 pgs. (Dec. 2014).
Bluetooth, "Bluetooth 4.1 Frequently Asked Questions", 5 pgs. (Nov. 2013).
Texas Instruments, "Texas Instruments CC2540/41 Bluetooth Low Energy Software Developer's Guide v1.3.2", 56 pgs. (2013).
"European Search Report," EP Application No. 16161488.8, 6 pages, (Jul. 2016).

* cited by examiner

MULTIPLE CONNECTION MANAGEMENT FOR BLUETOOTH LOW ENERGY DEVICES

RELATED APPLICATIONS

This application claims priority under 35 USC §119 to Romanian Patent Application No. A201500231 filed on Mar. 30, 2015, and entitled "MULTIPLE CONNECTION MANAGEMENT FOR BLUETOOTH LOW ENERGY DEVICES," which application is hereby incorporated by reference in its entirety.

TECHNICAL FIELD

This technical field relates to management of connections for Bluetooth devices and, more particularly, to management of multiple connections for Bluetooth Low Energy (BLE) devices.

BACKGROUND

The Bluetooth Specification standard version 4.1 and 4.2 for Bluetooth Low Energy (BLE) introduces one-to-many topology for a BT device that is simultaneously connected to multiple BT peer devices. These BLE specifications also state that pairing information and other important data are to be persistent between subsequent connections of BT peer devices on a BT device that supports bonding, for example, to facilitate future reconnections. As such, devices supporting these BLE standards are typically configured to store persistent information for Bluetooth (BT) peer devices in BT device (BD) database stored within non-volatile memory (NVM), such as a FLASH memory. The entire BD database is then copied at device power-on reset (PoR) from NVM to volatile memory, such as random-access-memory (RAM) that is used for run-time operations for the BT device. As such, all information concerning bonded BT peer devices form the BD database is stored within the volatile memory regardless of whether any particular previously bonded BT peer device is currently in active connection with the BT device. Further, the BT device continues to perform data restore operations from the NVM to the volatile memory for each bonded BT peer device regardless of whether it is currently connected. In addition, when a bonded BT peer device disconnects from the BT device, the context information for the disconnected peer device is kept in volatile memory until the BT device powers down or makes a periodic NVM save from volatile memory to the NVM at which time information for unbonded and disconnected BT peer devices is discarded.

DESCRIPTION OF THE DRAWINGS

It is noted that the appended figures illustrate only example embodiments and are, therefore, not to be considered as limiting the scope of the present invention. Elements in the figures are illustrated for simplicity and clarity and have not necessarily been drawn to scale.

DETAILED DESCRIPTION

Figure 1:
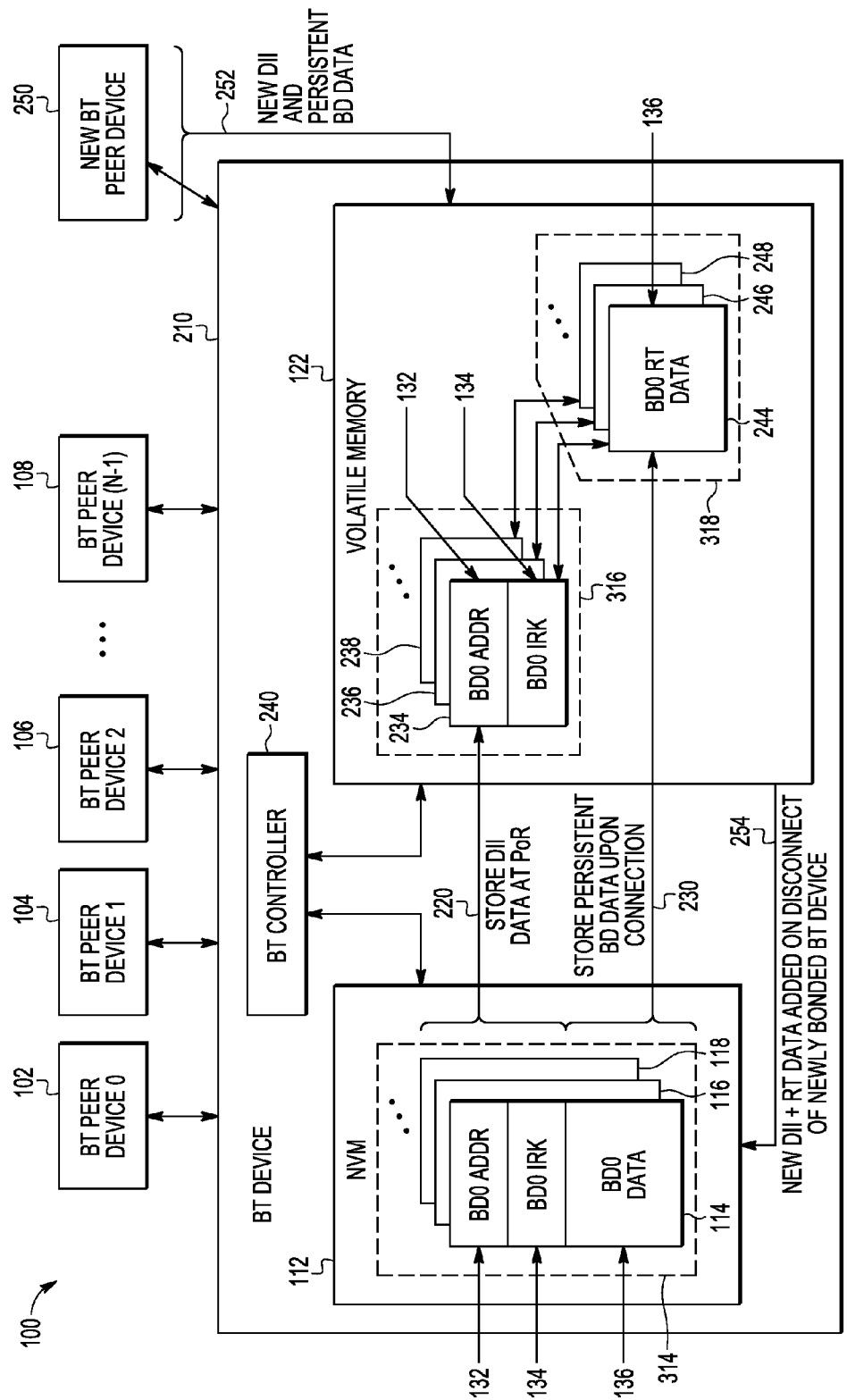
FIG. 1 is a block diagram of an example embodiment for a multiple connection environment where a BT device provides efficient management of identification and persistent information for multiple connections by copying identification data at power-on reset (PoR) and by copying persistent data from non-volatile memory to volatile memory only when a BT peer device forms an active connection.

Methods and systems are disclosed for multiple connection management for Bluetooth (BT) devices, and more particularly for BT Low Energy (BLE) devices, to multiple different bonded BT peer devices. A BT device database within a non-volatile memory (NVM) stores identification and persistent information for each bonded BT peer device. At power-on reset (PoR), only device identification information (DII) data, such as an address (ADDR) and an IRK (identity resolving key), for each bonded BT peer device is copied from the NVM to a volatile memory that is used for run-time operation of the BT device. When one of the bonded BT peer devices forms an active connection with the BT device, it is identified using the DII data, and persistent data for that bonded BT peer device is then copied from the NVM to the volatile memory and stored as run-time data. The BT device then communicates with the now actively connected BT peer device at least in part using the run-time data for the actively connected BT peer device. When a new unbonded BT peer device forms an active connection with the BT device and becomes bonded, identification and persistent information for that BT peer device can also be stored in the BT device database within the NVM for use in later reconnection events. In certain embodiments, one or more processing devices are coupled to the volatile memory and the NVM and are configured to control the connection management and other BT communication operations for the BT device. In certain embodiments, the BT device and the BT peer devices are configured to operate according to at least one of the Bluetooth Low Energy (BLE) standard version 4.1 or the BLE standard version 4.2. Different features and variations can be implemented, as desired, and related or modified systems and methods can be utilized, as well.

As described herein, therefore, the disclosed embodiments provide for efficient management of multiple connections by BT devices, including BT devices configured to operate according to the BLE standard versions 4.1 and/or 4.2. Efficient management is provided in part by copying persistent data for a bonded BT peer device from a BT device database in NVM to a volatile run-time memory only when the BT peer device forms an active connection with the BT device. Only device identification information (DII), such as address and IRK (identify resolving key) information, is copied from the NVM to the volatile run-time memory at power-on reset (PoR). Power-on reset (PoR) is a reset event for the BT device, such as a reset event that occurs when power is applied to a BT device during power up and/or a similar reset event that is triggered at other times during operation of the BT device. In many cases, it is improbable to have all of the bonded BT peer devices actively connected to the BT device at one time or within a short period of time after a system restart. Rather, it is more typical that some bonded BT peer devices will be connected and some will not be connected at the same time or within a given short period of time after system restart. Further, bonded and unbonded devices are also likely to coexist as active connection devices at the same time. By selectively loading information from the BT device database in NVM only for BT peer devices that are in active connection, both volatile memory usage and power are effectively conserved. Further, by loading less information at power-on reset (PoR), idle time during PoR is reduced thereby improving performance. In certain implementations, one or more processing devices execute instructions from a host software stack including one or more BT communication modules to manage these connections, to transfer DII data at power-on reset (PoR), and to transfer persistent data upon formation of an active connection. Other variations can also be implemented while still taking advantage of the efficient multiple connection management techniques described herein.

FIG. 1 is a block diagram of an example embodiment for a multiple connection environment 100 where a BT device 210 provides efficient management of identification and persistent information for multiple connections by copying identification data at power-on reset (PoR) and by copying persistent data from NVM 112 to volatile memory 122 only when a BT peer device forms an active connection. Multiple BT peer devices 102, 104, 106 . . . 108 are bonded to a BT device 210. In certain embodiments, the BT peer devices 102, 104, 106 . . . 108 and the BT device 210 are assumed to be configured to operate according to at least one of the Bluetooth Low Energy (BLE) standard version 4.1 or the BLE standard version 4.2. The BT controller 240 is coupled to the NVM 112 and the volatile memory 122 and is configured to control the connection management and other BT communication operations for the BT device 210. The NVM 112 for the BT device 210 stores identification and persistent information for each of the BT peer devices 102, 104, 106 . . . 108 in data records 114, 116, 118 . . . that form a BD database 314. For example, a different data record can be used to store persistent information for each of the BT peer devices, although multiple data records could also be used for each BT peer device if desired. As depicted with respect to data record 114, the information stored for the first BT peer device (BD0) 102 can include device identification information (DII), such an address (ADDR) 132 and an IRK (identify resolving key) 134, and persistent data 136 including operational parameters associated with the BT peer device (BD0) 102. Similar information can be stored for the other bonded BT peer devices (BD1, BD2 . . . BD(N−1)) 104, 106 . . . 108 using additional data records 116, 118 . . . that make up a BD database 314.

In contrast to prior solutions, however, the BT controller 240 operates to copy device identification information (DII) from the NVM 112 to the volatile memory 122 separately from the persistent information. In particular, as represented by bracket and arrow 220, only the device identification information (DII) from the BD data records 114, 116, 118 . . . for the bonded BT peer devices 102, 104, 106 . . . 108 is stored within volatile memory 122 at power-on reset (PoR) of the BT device 210. As represented by bracket and arrow 230, persistent data is only stored when a particular one of the BT peer devices 102, 104, 106 . . . 108 forms an active connection with the BT device 210. As such, for the example embodiment depicted, the address (ADDR) 132 and the IRK (identity resolving key) 134 associated with the first BT peer device (BD0) 102, which make up the DII data for embodiment 100, is copied from NVM 112 and stored within record 234 upon power-on reset (PoR) of the BT device 210. Similar DII data is stored at power-on reset (PoR) for the other bonded BT peer devices (BD1, BD2 . . . BD(N−1)) 104, 106 . . . 108 using additional data records 236, 238 . . . that together with record 234 make up a BD database 316 of DII information stored within the volatile memory 122. The DII information stored within the volatile memory 122 is then used to identify bonded BT peer devices (BD1, BD2 . . . BD(N−1)) 104, 106 . . . 108 when each forms an active connection with the BT device 210. The persistent data 136 associated with the first BT peer device (BD0) 102 is only stored as run-time (RT) data within record 244 upon an active connection of the first BT peer device (BD0) 102 to the BT device 210. Similar persistent data is stored upon active connection of the other bonded BT peer devices (BD1, BD2 . . . BD(N−1)) 104, 106 . . . 108 to the BT device 210 using additional data records 246, 248 . . . that together with record 244 make up a BD database 318 of run-time data stored within the volatile memory 122. It is noted that the run-time data records 244, 246, 248 . . . for each particular BT peer device 102, 104, 106 . . . 108 can be linked to the DII records 234, 236, 238 . . . also associated with that particular BT peer device 102, 104, 106 . . . 108. It is further noted that the run-time data in BD database 318 includes operational parameters that are used by the BT device 210 at least in part to communicate with the BT peer devices 102, 104, 106 . . . 108. Other variations could also be implemented.

In operation of the BT device 210, therefore, DII information for the bonded BT peer devices 102, 104, 106 . . . 108 is copied to and retained within volatile memory 122 regardless of whether any particular BT peer device is currently actively connected. However, the persistent information for the bonded BT peer devices 102, 104, 106 . . . 108 is copied to and retained within volatile memory 122 only after an active connection has been formed between the particular BT peer device 102, 104, 106 . . . 108 and the BT device 210. When a BT peer device 102, 104, 106 . . . 108 later disconnects from the BT device 210, the run-time data can be erased or otherwise removed from the volatile memory 122, and the DII data can be retained in the volatile memory 122. If the BT peer device 102, 104, 106 . . . 108 then reconnects, the persistent data can again be copied from the NVM 112 to the volatile memory 122 and stored as run-time data that can be used by the BT device 210 to communicate with the reconnected BT peer device. Thus, startup delays at power-on reset (PoR) are reduced, and memory space requirements and power usage for the volatile run-time memory is reduced thereby providing for more efficient and improved performance of the BT device 210, particularly for low power environments.

The BT device 210 is also configured to efficiently manage connections to new BT peer devices, such as new BT peer device 250 shown in FIG. 1. As described in more detail below, persistent information for the new BT peer device 250 is stored within volatile memory 122 when the new BT peer device 250 forms an active connection to the BT device 210. For example, new device identification information (DII) data and persistent BD data 252 can be communicated from the new BT peer device 250 and stored within the volatile memory 122 when a new active connection is formed. The DII data can be stored within one of the DII records 234, 236, 238 . . . , and the persistent data can be stored within one of the run-time (RT) records 244, 246, 248 . . . so that the connection and operational information for the new BT peer device 250 is stored within volatile memory 122. If the new BT peer device 250 is bonded to the BT device 210, this new DII and persistent BD data 252 is copied to and stored within one of the data records 114, 116, 118 . . . within the NVM 112, as represented by transfer 254. For example, new DII and persistent BD data 252 can be copied when the new bonded BT peer device 250 disconnects from the BT device 210, when the BT device 210 powers down or resets, or at some other selected event. As such, when the BT device 210 again powers-up again or comes out of reset, the newly stored DII data for the newly bonded BT peer device 250 is loaded along with the other DII data as described above with respect to transfer 220, while the persistent data is not loaded until the newly bonded BT peer device 250 again forms an active connection with the BT device 210 as represented by transfer 230.

As indicated above, the BT controller 240 for the BT device 210 is coupled to the NVM 112 and to the volatile memory 122 and controls the connection management and BT communications for the BT device 210. In part, the BT controller 240 manages the four sets of data that are stored in NVM 112 and volatile memory 122. In particular, the NVM 112 stores: (1) a set of data that includes DII data for each bonded BT peer device such as BD addresses (AD-DRs), IRKs, and/or other identification information, and (2) a set of persistent data for each bonded BT peer device such as device information (e.g., name, appearance, class, etc.), connection parameters, attribute cache (e.g., list, CCCD (client characteristic configuration descriptor), authorization data, etc.), security parameters (e.g., keys, pairing information, etc.), and/or other run-time persistent information. The volatile memory 122 stores: (1) a set of data that includes the DII data for each bonded BT peer device received from the NVM 112 and DII data received from each newly connected BT peer devices, and (2) a set of data that includes run-time data for bonded BT peer devices that form active connections and run-time data received from newly connected BT peer devices. As described herein, the run-time data for bonded BT peer devices is based upon persistent data for bonded BT peer devices that is copied from NVM 112 to volatile memory 122 when an active connection is formed by one of the bonded BT peer device. Other variations and sets of data could be stored while still taking advantage of the efficient connection management techniques described herein.

As one example, a restaurant environment can be considered as one example environment where the disclosed embodiments can be used to effectively manage multiple connections and thereby improve performance. For example, a BT device operating as a BLE peripheral device in a restaurant (e.g., switch, sensor, etc.) can be the BT device 210 that bonds with the smartphone of each member of the restaurant staff (e.g., 30 people) as BT peer devices 102, 104, 106 . . . 108. This BLE peripheral device, for example, can be configured to trigger certain actions within the restaurant (e.g., unlock doors, turn lights on and off, etc.). It is likely that only one staff member would be connected at any given moment to execute an action using this BLE peripheral device and then disconnect. For this example, it is assumed that for each bonded BT peer device (e.g., smartphone), approximately 100 bytes of BD connection data is saved including about 17 bytes of DII data and 83 bytes of run-time/persistent data. Inefficient prior solutions would store the entire data set for 31 devices (e.g., 30 smartphones and the device itself) within the volatile memory 122 on power-on reset (PoR) (e.g., 31×100 bytes or approximately 3 kilo-bytes (kB) of data). In contrast, the efficient connection management embodiments described here would store only the DII data in the volatile memory 122 at power-on reset (PoR) (e.g., 31×17 bytes or approximately 0.6 kB of data), and the remaining run-time/persistent data would only be stored in the volatile memory 122 when a BT peer device (e.g., smartphone) formed at active connection (e.g., 1×83 bytes or approximately 0.08 kB of data). Again, it is assumed that only one staff smartphone at a time would likely form an active connection with the BT device 210 (e.g., BLE peripheral device) at any given time. The decrease in usage of the volatile memory 122, therefore, is nearly 80% (e.g., only 0.68 kB of data as opposed to 3.0 kB of data). As such, significant memory space and power savings are achieved, as a smaller amount of volatile memory is used and/or maintained through data restoration/refresh operations during operation of the BT device 210.

Figure 2:
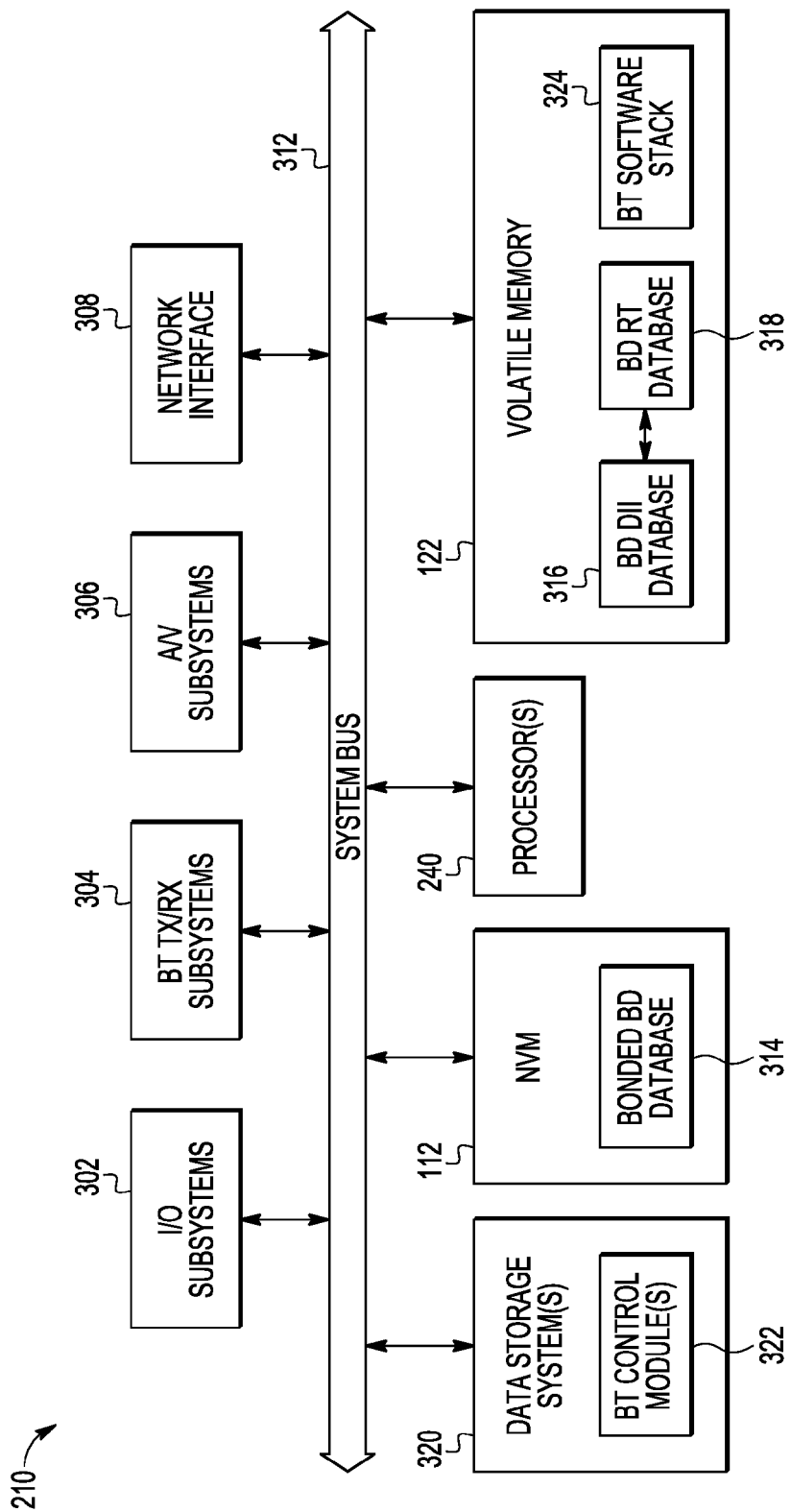
FIG. 2 is a block diagram of an example embodiment for components for a BT device including efficient multiple connection management.

FIG. 2 is a block diagram of an example embodiment for components for a BT device 210. One or more processors operate as the BT controller 240 and communicate with other components through system bus 312. For example, the one or more processors 240 communicate with input/output (I/O) subsystems 302, audio/video (A/V) subsystems 306, and/or network interface 308 through the system bus 312. Further, BT transmit/receive (TX/RX) subsystems 304 are also coupled to the system bus 312 and operate to communicate with the BT peer devices 102, 104, 106 . . . 108. The NVM 112 is coupled to the system bus 312 and stores the database 314 of DII and persistent information for the bonded BT peer devices (BDs) 102, 104, 106 . . . 108. The volatile memory 122 is coupled to the system bus 312 and stores the database 316 of DII information for all of the bonded BT peer devices (BDs) 102, 104, 106 . . . 108. The volatile memory 122 also stores the database 318 for the run-time information for the actively connected BT peer devices (BDs) 102, 104, 106 . . . 108. One or more data storage system(s) 320 are also connected to the system bus 312 and stored one or more BT control module(s) 322 that represent software instructions that can be executed by the processor(s) 240 to carry out the functions described herein. For example, instructions from the BT control module(s) 322 can be loaded within a BT software stack 324 within the volatile memory 122 and executed by the processor(s) 240 to carry out the functions described herein.

It is noted that different and/or additional components could also be used to implement BT device 210 while still taking advantage of the efficient connection management techniques described herein. It is further noted that the system bus 312 can be implemented as multiple interconnection buses with our without additional intervening circuitry. Further, the processor(s) 240 can be implemented using one or more processing devices including controllers, microcontrollers, microprocessors, hardware accelerators, configurable logic devices (e.g., field programmable gate arrays), and/or other processing devices. Further, the one or more processing devices can execute instructions stored in a non-transitory tangible computer-readable medium to perform the functions described herein. In addition, data storage system(s) 320 can be implemented as any desired non-transitory tangible medium that stores data, such as data storage devices, FLASH memory, random access memory, read only memory, programmable memory devices, reprogrammable storage devices, hard drives, floppy disks, DVDs, CD-ROMs, and/or any other non-transitory data storage mediums. The NVM 112 can similarly be any such data storage medium configured to maintain data storage when the BT device 210 is not powered. The volatile memory 122 can be any such data storage medium configured to maintain data storage when the BT device is powered. Typically, the volatile memory 122 will be configured to operate at a faster rate than the NVM 112 and is therefore used to store run-time data. However, the volatile memory 122 will often require more power than the NVM 112 to maintain stored data through data restoration or refresh operations. In one embodiment, the NVM 112 is a FLASH memory, and the volatile memory is a random access memory (RAM). Other variations could also be implemented.

Figure 3:
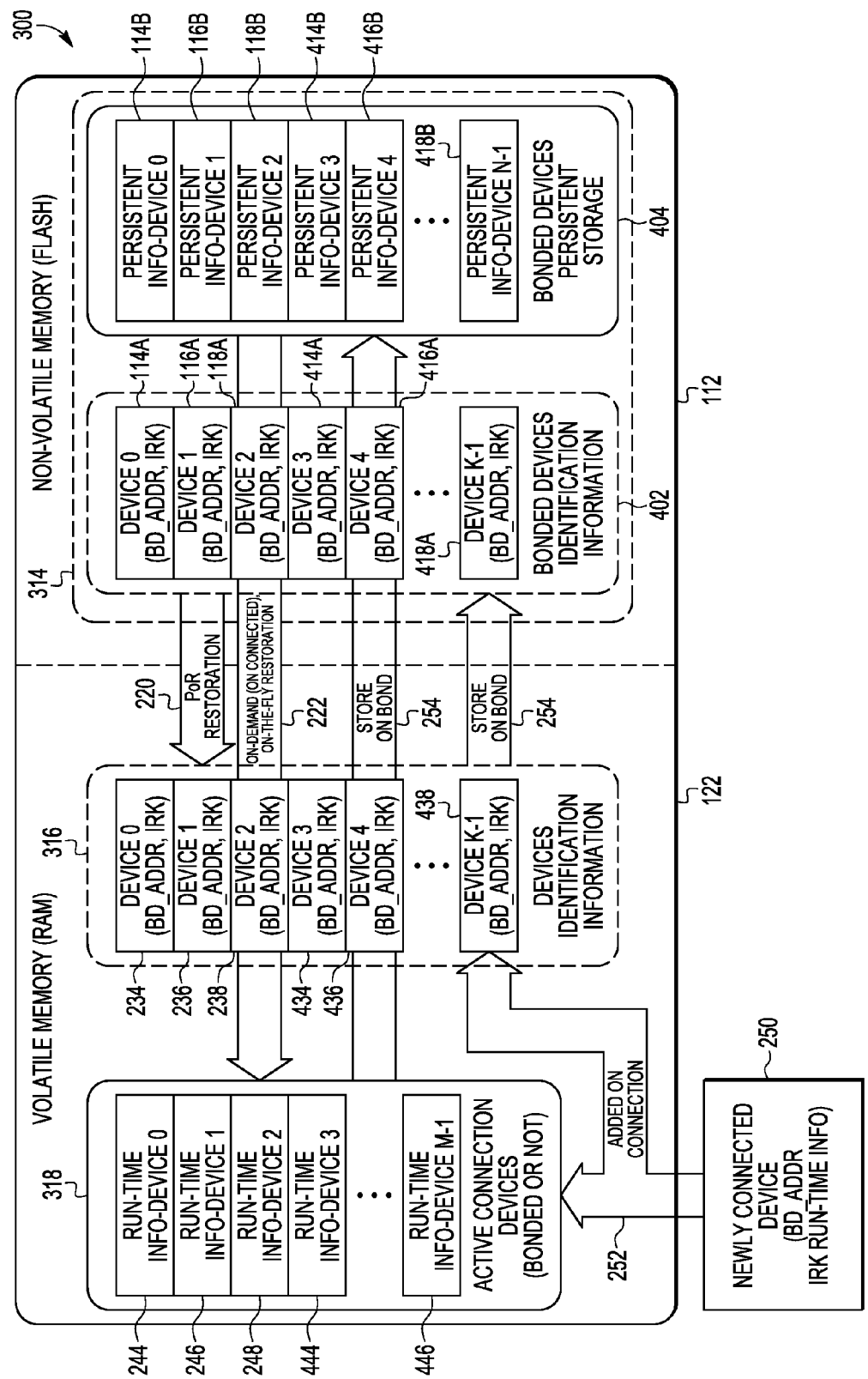
FIG. 3 is a block diagram of an example embodiment where volatile memory is implemented as a random-access-memory (RAM) and where the non-volatile memory is implemented as a FLASH memory.

FIG. 3 is a block diagram of an example embodiment 300 wherein the volatile memory 122 is implemented as a random-access-memory (RAM) and where the non-volatile memory 112 is implemented as a FLASH memory. The database 314 within the FLASH memory 112 includes a first set of data 402 that includes bonded device identification information (DII) and a second set of data 404 that includes bonded device persistent data. In particular, data records 114A, 116A, 118A, 414A, 416A . . . 418A within the first data set 402 store BD addresses and IRKs for N different bonded BT peer devices. The data records 114B, 116B, 118B, 414B, 416B . . . 418B within the second data set 404 store persistent information for the N different bonded BT peer devices. The database 316 within the RAM 122 includes a third set of data that is stored within data records 234, 236, 238, 434, 436 . . . 438, and these records include device identification information (DII) for K different devices including all of the N bonded BT peer devices 102, 104, 106 . . . 108 and any newly connected BT peer device 250. The database 318 within the RAM 122 includes a fourth set of data that is stored within data records 244, 246, 248, 444, 446 . . . 448, and these records include run-time/persistent information for M different active connection devices (ACD) including actively connected bonded BT peer devices 102, 104, 106 . . . 108 and any newly connected BT peer device 250. It is also noted that the BT devices 110 and the BT peer devices 250, 102, 104, 106 . . . 108 can further include one or more operational modules that form a general access profile (GAP) for the BT device and provide base BT communication functionality such as modes and access procedures used for BT transports, protocols, and application profiles and BT services such as device discovery, connection modes, security, authentication, association models and service discovery.

As described above, the DII information from data set 402 for bonded BT peer devices is transferred on power-on reset (PoR) from the NVM 112 to data set 316 within the volatile memory 122 as represented by arrow 220. As represented by arrow 222, the persistent information for bonded BT peer devices in data set 404 is transferred on-demand from NVM 112 to run-time information data set 318 within the volatile memory 122 when an active connection occurs, also leading to on-the-fly restoration of the transferred data. As represented by arrow 252, DII and persistent information for a newly connected BT peer device 250 is added to volatile memory 122 upon the formation of an active connection. In addition, as represented by arrows 254, this DII and persistent run-time (RT) data for newly connected BT peer device 250 is copied to and stored within NVM 112 when the newly connected BT peer device 250 becomes bonded to the BT device 210. For example, this transfer of information 254 can occur when the new BT peer device 250 disconnects from BT device 210, when the BT device powers-down or resets, or at some other selected event.

Figure 4A:
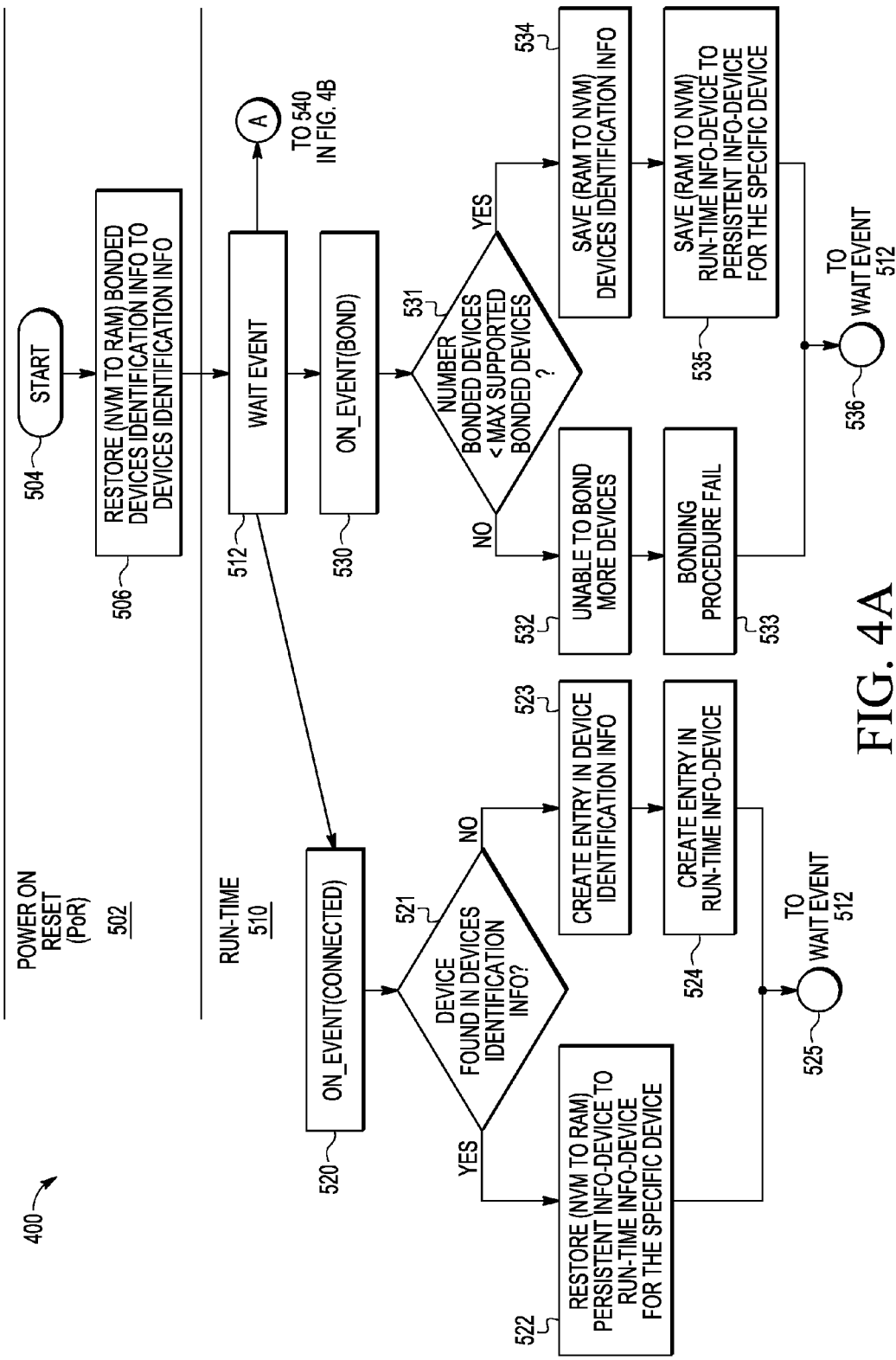
FIGS. 4A-B provide a process flow diagram of an example embodiment for efficient management of multiple connections between a BT device and multiple BT peer devices.
Figure 4B:
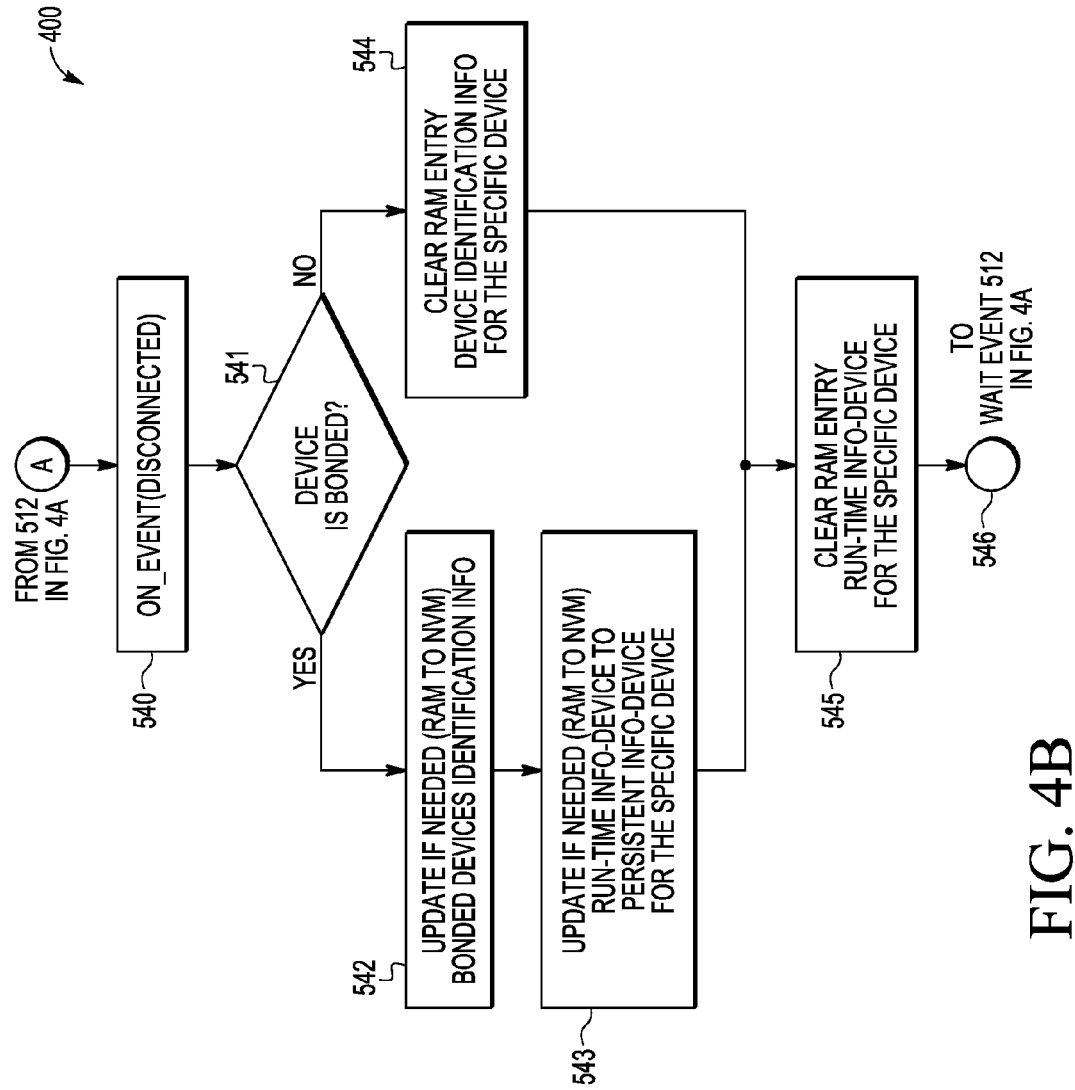

FIGS. 4A-B provide a process flow diagram of an example embodiment 400 for efficient management of multiple connections between a BT device 210 and multiple BT peer devices 102, 104, 106 . . . 108. Two operational phases are shown including a power-on reset (PoR) operational phase 502 and a run-time operational phase 510. The process starts at node 504 and flows to node 506 where bonded DII data from NVM 112 is restored to volatile memory (e.g., RAM) 122 as DII data. Flow then passes to WAIT event 512 until any one of three events occurs as represented by blocks 520, 530, and 540. It is noted, as described above, that a BT controller 240 can operate to control the connection management and BT communications for a BT device 210 and can be implemented, for example, using one or more processing devices executing one or more BT control modules 322 loaded in a BT software stack 324 in volatile run-time memory 122. It is also noted that embodiment 400 provides one example process flow, and different and/or additional processing blocks could also be implemented, as desired, while still taking advantage of the debug key and marker generation techniques described herein.

Block 520 is reached on an event occurrence of the connection of a BT peer device 102, 104, 106 . . . 108 with the BT device 210. Flow then passes to block 512 where a determination is made whether the newly connected device is already found in the DII data stored in volatile memory 122. If "YES," then flow passes to block 522 wherein persistent information is restored from the NVM 112 to the RAM 122 as run-time information for the specific device that has been connected. If "NO," then flow passes to block 523 where a new entry is created and stored within the DII database 316 for the DII data for the new device. Flow then passes to block 524 wherein an associated entry is created in the BD database 318 for the run-time information for the new device. From block 522 or block 524, flow then passes to node 525 which represents a return to the WAIT event of block 512.

Block 530 is reached on an event occurrence of a bonding of a connected device, such as newly connected device 250. Flow then passes to block 531 where a determination is made whether the number of bonded devices for the BT device 210 is less than the maximum number of supported bonded devices. If "YES," then flow passes to block 534 where DII data for the newly bonded device is saved from the RAM 122 to the NVM 112. Flow then passes to block 535 where run-time information for the newly bonded device is saved from the RAM 122 to the NVM 112 as persistent information for the newly bonded device. If "NO," then flow passes to block 532 wherein a control or warning message is generated that indicates that the BT device 210 is unable to bond more devices. Block 533 is then reached where the bonding procedure is failed. From block 533 or block 535, flow then passes to node 536 which represents a return to the WAIT event of block 512.

Looking to FIG. 4B, block 540 is reached on an event occurrence of the disconnection of a BT peer device 102, 104, 106 . . . 108 from the BT device 210. Flow then passes to block 541 where a determination is made whether the device is currently bonded. If "NO," then flow passes to block 544 where the DII data entry in RAM 122 for the disconnecting device is cleared, and flow passes to block 545. If "YES," then flow passes to block 542 where the bonded DII data in NVM 112 is updated, if needed, with the DII information for the disconnecting device. Flow then passes to block 543 where the persistent information for the bonded device in the NVM 112 is updated, if needed, with the run-time information for the disconnecting device. Flow then passes to block 545. In block 545, the entry in RAM 122 for the run-time data entry for the disconnecting device is cleared. Flow then passes to node 546 which represents a return to the WAIT event of block 512 in FIG. 4A.

In operation, therefore, the BT device 210 efficiently manages connections to multiple BT peer devices 102, 104, 106 . . . 108 within different operating phases of the BT device 210. As described above, certain functions are triggered by events relating to the connection characteristics between the BT device 210 (e.g., BLE peripheral device) and the BT peer devices (e.g., central client devices). For example, during a power-on reset (PoR) phase 502, only DII data is loaded from NVM 112 into RAM 122 and the active device connection (ACD) records are empty. During runtime phase 504, when a device connects, the DII data is used to check whether the connecting BT peer device is bonded or not. If it is not bonded, a new entry in DII database is created for that device and filled with its BD address (ADDR). If it is bonded, the corresponding persistent device information from the NVM 112 is loaded to RAM 122 into a new slot of ACD database 318. If the device is not bonded, a new entry in ACD database 318 is created and filled with default run-time data for the newly connected BT peer device. Whenever information is acquired about this device, it is written to this ACD slot to update the default information. After pairing and key exchanges, the IRK (Identity Resolving Key) of the newly connected BT peer device is written in the DII data slot in the database 316, while the other keys are written as run-time information in ACD data slots in database 318. When the new device performs bonding, the data from the ACD database 318 and the DII database 316 is stored in a new slot in database 314 within the NVM 112. When a device is subsequently disconnected, for example by request or by going out-of-service-area, its run-time information (and DII information if it has not been bonded) will be released. When a sleep or power-off phase is entered, the BT device 210 can perform a maintenance action on the ACD database 318 and the DII database 316 before entering a low power state, and this maintenance action can in part update corresponding data, as needed, within the database 314 within NVM 112. Other variations and operational modes can also be implemented while still taking of the efficient connection management techniques described herein.

As described herein, a variety of embodiments can be implemented and different features and variations can be implemented, as desired.

For one embodiment, a method to manage connections to a Bluetooth device is disclosed including performing a power-on reset (PoR) for a Bluetooth (BT) device having a volatile memory and a non-volatile memory (NVM), where the NVM is storing device identification information (DII) data and persistent BT data associated with a plurality of bonded BT peer devices, and prior to an active connection being formed with one of the bonded BT peer devices, accessing the DII data within the NVM and storing the DII data in the volatile memory, where the persistent BT data is not stored in the volatile memory prior to an active connection being formed with one of the bonded BT peer devices.

In further embodiments, the BT device operates according to at least one of the Bluetooth Low Energy (BLE) standard version 4.1 or the BLE standard version 4.2. In still further embodiments, the DII data includes a device address and an IRK (identity resolving key), and the persistent data includes one or more of connection parameters, authorization data, or security parameters.

In other embodiments, the method further includes forming an active connection with one or more of the bonded BT peer devices, accessing persistent BT data within the NVM for each connected BT peer device, and storing the persistent BT data in the volatile memory as run-time data for each connected BT peer device. In further embodiments, the method includes communicating with each connected BT peer device at least in part using the run-time data stored in the volatile memory. In additional embodiments, the method includes disconnecting from one or more of the bonded BT peer devices, and clearing the run-time data from the volatile memory for each of the disconnected BT peer devices.

In additional embodiments, the method includes forming an active connection with an unbonded BT peer device, storing DII data from the unbonded BT peer device in the volatile memory, and storing persistent data from the unbonded BT peer device in the volatile memory as run-time data for the unbonded BT peer device. In further embodiments, the method includes disconnecting from the unbonded BT peer device, and clearing the DII data and the run-time data for the unbonded BT peer device from the volatile memory. In other embodiments, the method includes bonding the unbonded BT peer device to the BT device as a newly bonded BT peer device, storing the DII data for the newly bonded BT peer device in the NVM, and storing the run-time data for the newly bonded BT peer device in the NVM as persistent data for the newly bonded BT peer device. In still further embodiments, the method includes disconnecting from the newly bonded BT peer device and clearing the run-time data for the newly bonded BT peer device from the volatile memory.

For another embodiment, a Bluetooth (BT) device having device connection management is disclosed including a volatile memory, a non-volatile memory (NVM) including device identification information (DII) data and persistent BT data associated with a plurality of bonded BT peer devices, and one or more processing devices coupled to the volatile memory and the NVM and configured upon power-on reset (PoR) of the Bluetooth (BT) device, and prior to an active connection being formed with one of the bonded BT peer devices, to access the DII data within the NVM and store the DII data in the volatile memory, where the persistent BT data is not stored in the volatile memory prior to an active connection being formed with one of the bonded BT peer devices.

In further embodiments, the BT device is configured to operate according to at least one of the Bluetooth Low Energy (BLE) standard version 4.1 or the BLE standard version 4.2. In still further embodiments, the DII data includes a device address and an IRK (identity resolving key), and the persistent data includes one or more of connection parameters, authorization data, or security parameters.

In other embodiments, the one or more processing devices are further configured upon formation of an active connection with one or more of the bonded BT peer devices to access persistent BT data within the NVM for each connected BT peer device and store the persistent BT data in the volatile memory as run-time data for each connected BT peer device. In additional embodiments, the one or more processing devices are further configured to communicate with each connected BT peer device at least in part using run-time data stored in the volatile memory. In additional embodiments, the one or more processing devices are further configured upon a disconnection from one or more of the bonded BT peer devices to clear the run-time data from the volatile memory for each of the disconnected BT peer devices.

In additional embodiments, the one or more processing devices are further configured upon formation of an active connection with an unbonded BT peer device to store DII data from the unbonded BT peer device in the volatile memory and store persistent data from the unbonded BT peer device in the volatile memory as run-time data for the unbonded BT peer device. In further embodiments, the one or more processing devices are further configured upon disconnection from the unbonded BT peer device to clear the DII data and the run-time data for the unbonded BT peer device from the volatile memory. In other embodiments, the one or more processing devices are further configured upon a bonding of the unbonded BT peer device to the BT device as a newly bonded BT peer device to store the DII data for the newly bonded BT peer device in the NVM and store the run-time data for the newly bonded BT peer device in the NVM as persistent data for the newly bonded BT peer device. In still further embodiments, the one or more processing devices are further configured upon disconnection from the newly unbonded BT peer device to clear the run-time data for the newly bonded BT peer device from the volatile memory.

It is noted that the functional blocks, devices, and/or circuitry described herein can be implemented using hardware, software, or a combination of hardware and software. In addition, one or more processing devices (e.g., central processing units (CPUs), controllers, microcontrollers, microprocessors, hardware accelerators, processors, and/or other processing devices) executing software and/or firmware instructions can be used to implement the disclosed embodiments. It is further understood that one or more of the operations, tasks, functions, or methodologies described herein can be implemented, for example, as software, firmware and/or other program instructions that are embodied in one or more non-transitory tangible computer-readable mediums (e.g., data storage devices, flash memory, random access memory, read only memory, programmable memory devices, reprogrammable storage devices, hard drives, floppy disks, DVDs, CD-ROMs, and/or any other tangible storage medium) and that are executed by one or more central processing units (CPUs), controllers, microcontrollers, microprocessors, hardware accelerators, processors, and/or other processing devices to perform the operations and functions described herein.

Unless stated otherwise, terms such as "first" and "second" are used to arbitrarily distinguish between the elements such terms describe. Thus, these terms are not necessarily intended to indicate temporal or other prioritization of such elements.

Further modifications and alternative embodiments of the described systems and methods will be apparent to those skilled in the art in view of this description. It will be recognized, therefore, that the described systems and methods are not limited by these example arrangements. It is to be understood that the forms of the systems and methods herein shown and described are to be taken as example embodiments. Various changes may be made in the implementations. Thus, although the invention is described herein with reference to specific embodiments, various modifications and changes can be made without departing from the scope of the present invention. Accordingly, the specification and figures are to be regarded in an illustrative rather than a restrictive sense, and such modifications are intended to be included within the scope of the present invention. Further, any benefits, advantages, or solutions to problems that are described herein with regard to specific embodiments are not intended to be construed as a critical, required, or essential feature or element of any or all the claims.

What is claimed is:

1. A method to manage connections to a Bluetooth device, comprising:
    performing a power-on reset (PoR) for a Bluetooth (BT) device having a volatile memory and a non-volatile memory (NVM), the NVM storing device identification information (DII) data and persistent BT data associated with a plurality of bonded BT peer devices; and
    prior to an active connection being formed with one of the bonded BT peer devices,
        accessing the DII data within the NVM; and
        storing the DII data in the volatile memory;
        wherein the persistent BT data is not stored in the volatile memory prior to an active connection being formed with one of the bonded BT peer devices.

2. The method of claim 1, further comprising:
    forming an active connection with one or more of the bonded BT peer devices;
    accessing persistent BT data within the NVM for each connected BT peer device; and
    storing the persistent BT data in the volatile memory as run-time data for each connected BT peer device.

3. The method of claim 2, further comprising communicating with each connected BT peer device at least in part using the run-time data stored in the volatile memory.

4. The method of claim 2, further comprising:
    disconnecting from one or more of the bonded BT peer devices; and
    clearing the run-time data from the volatile memory for each of the disconnected BT peer devices.

5. The method of claim 1, wherein the DII data comprises a device address and an IRK (identity resolving key), and wherein the persistent data comprises one or more of connection parameters, authorization data, or security parameters.

6. The method of claim 1, further comprising:
    forming an active connection with an unbonded BT peer device;
    storing DII data from the unbonded BT peer device in the volatile memory; and
    storing persistent data from the unbonded BT peer device in the volatile memory as run-time data for the unbonded BT peer device.

7. The method of claim 6, further comprising:
    disconnecting from the unbonded BT peer device; and
    clearing the DII data and the run-time data for the unbonded BT peer device from the volatile memory.

8. The method of claim 6, further comprising:
    bonding the unbonded BT peer device to the BT device as a newly bonded BT peer device;
    storing the DII data for the newly bonded BT peer device in the NVM; and
    storing the run-time data for the newly bonded BT peer device in the NVM as persistent data for the newly bonded BT peer device.

9. The method of claim 8, further comprising:
    disconnecting from the newly bonded BT peer device; and
    clearing the run-time data for the newly bonded BT peer device from the volatile memory.

10. The method of claim 1, wherein the BT device operates according to at least one of the Bluetooth Low Energy (BLE) standard version 4.1 or the BLE standard version 4.2.

11. A Bluetooth (BT) device having device connection management, comprising
    a volatile memory;
    a non-volatile memory (NVM) including device identification information (DII) data and persistent BT data associated with a plurality of bonded BT peer devices; and
    one or more processing devices coupled to the volatile memory and the NVM and configured upon power-on reset (PoR) of the Bluetooth (BT) device, and prior to an active connection being formed with one of the bonded BT peer devices, to:
   access the DII data within the NVM; and
   store the DII data in the volatile memory;
   wherein the persistent BT data is not stored in the volatile memory prior to an active connection being formed with one of the bonded BT peer devices.

12. The BT device of claim 11, wherein the one or more processing devices are further configured upon formation of an active connection with one or more of the bonded BT peer devices to:
   access persistent BT data within the NVM for each connected BT peer device; and
   store the persistent BT data in the volatile memory as run-time data for each connected BT peer device.

13. The BT device of claim 12, wherein the one or more processing devices are further configured to communicate with each connected BT peer device at least in part using run-time data stored in the volatile memory.

14. The BT device of claim 12, wherein the one or more processing devices are further configured upon a disconnection from one or more of the bonded BT peer devices to:
   clear the run-time data from the volatile memory for each of the disconnected BT peer devices.

15. The BT device of claim 11, wherein the DII data comprises a device address and an IRK (identity resolving key), and wherein the persistent data comprises one or more of connection parameters, authorization data, or security parameters.

16. The BT device of claim 11, wherein the one or more processing devices are further configured upon formation of an active connection with an unbonded BT peer device to:
   store DII data from the unbonded BT peer device in the volatile memory; and
   store persistent data from the unbonded BT peer device in the volatile memory as run-time data for the unbonded BT peer device.

17. The BT device of claim 16, wherein the one or more processing devices are further configured upon disconnection from the unbonded BT peer device to:
   clear the DII data and the run-time data for the unbonded BT peer device from the volatile memory.

18. The BT device of claim 16, wherein the one or more processing devices are further configured upon a bonding of the unbonded BT peer device to the BT device as a newly bonded BT peer device to:
   store the DII data for the newly bonded BT peer device in the NVM; and
   store the run-time data for the newly bonded BT peer device in the NVM as persistent data for the newly bonded BT peer device.

19. The BT device of claim 18, wherein the one or more processing devices are further configured upon disconnection from the newly unbonded BT peer device to:
   clear the run-time data for the newly bonded BT peer device from the volatile memory.

20. The BT device of claim 11, wherein the BT device is configured to operate according to at least one of the Bluetooth Low Energy (BLE) standard version 4.1 or the BLE standard version 4.2.

* * * * *